United States Patent
Di Giusto et al.

[11] Patent Number: 4,598,497
[45] Date of Patent: Jul. 8, 1986

[54] SLIDING PANE FOR MOTOR VEHICLE WINDOWS

[75] Inventors: Nevio Di Giusto, Cellegno; Felice Cornacchia, Turin, both of Italy

[73] Assignee: Fiat Auto S.p.A., Turin, Italy

[21] Appl. No.: 718,988

[22] Filed: Apr. 2, 1985

[30] Foreign Application Priority Data

Apr. 2, 1984 [IT] Italy ............................ 53213/84[U]

[51] Int. Cl.$^4$ .............................................. E06B 1/04
[52] U.S. Cl. ........................................ 49/374; 49/441
[58] Field of Search ................ 49/376, 374, 375, 441; 296/146

[56] References Cited

FOREIGN PATENT DOCUMENTS 126400 11/1984 European Pat. Off. ............ 296/146

*Primary Examiner*—Philip C. Kannan
*Attorney, Agent, or Firm*—Sughrue, Mion, Zinn, Macpeak, and Seas

[57] ABSTRACT

A sliding pane for a motor vehicle window has the corners of its edges intended to face outwardly of the vehicle chamfered to define outer tapered portions which are housed in respective guide channels of the window. This enables the outer surface of the pane contiguous with the chamfers to be coplanar with the outer surface of those parts of the vehicle body defining the window opening, so as to reduce the turbulence arising from discontinuities in the outer surface of the vehicle.

1 Claim, 1 Drawing Figure

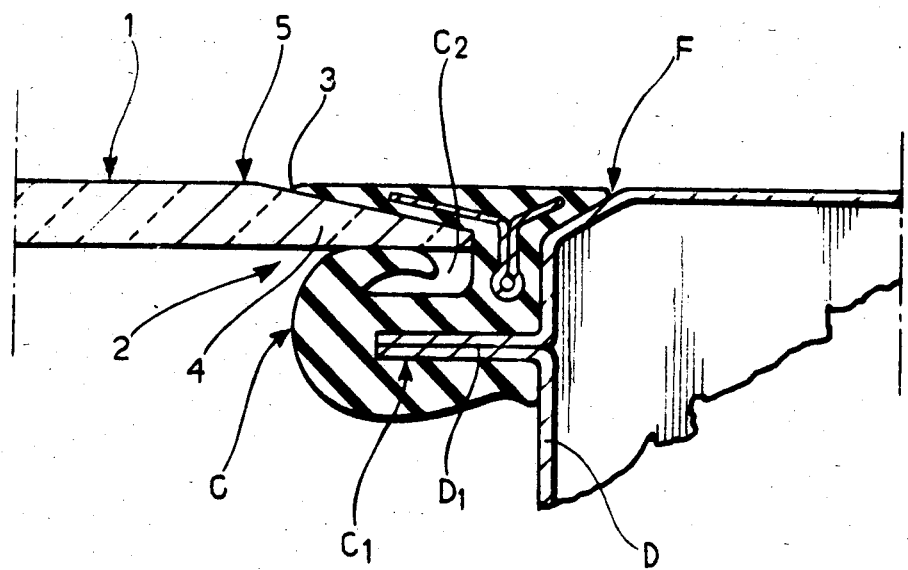

SLIDING PANE FOR MOTOR VEHICLE WINDOWS

The present invention relates to sliding panes for motor vehicle windows, and is particularly concerned with a pane having edges which, in use, are slidable in the channels of respective channel-shaped guide bodies fixed to the parts of the motor vehicle body defining the window opening.

According to one mode of assembly used conventionally in the automobile field, the channel-shaped guide bodies, which open into the window opening, are mounted in the regions of the body defining the vertical sides (pillars) and upper side (cross member) of the window opening, both when the latter is formed in the door of the vehicle and when it is associated with a fixed part of the bodywork.

This conventional mode of assembly gives rise to turbulence during movement of the vehicle, which is localised mainly in correspondence with the vertical sides of the window. This phenomenon, which has a harmful effect on the aerodynamic characteristics of the motor vehicle and causes noise during running, occurs essentially because of the fact that the peripheral regions of the surface of the pane facing outwardly of the vehicle are slightly recessed ("sunken") relative to the outer surface of the adjacent parts of the body defining the window opening.

In order to eliminate or at least reduce the effect of this phenomenon, various different modes of assembly have been proposed previously which allow the outwardly-facing surface of the pane to be brought into a position in which it is substantially coplanar ("flush") with the outer surface of the vehicle body. For example, it has been proposed to use channel-shaped guide bodies with an asymmetric profile in which the channels that guide the sliding movement of the pane are displaced outwardly of the vehicle relative to the channels of conventional guide bodies.

The object of the present invention is to provide a sliding pane which can be used easily and conveniently even with guide bodies of the conventional type, so as to minimise, and in fact eliminate, the turbulence described above.

According to the present invention, this object is achieved by a sliding pane of the type specified above, wherein the corners of the edges intended to face outwardly of the vehicle are chamfered to define outer tapered portions which can be housed slidingly in the channels of the respective guide bodies in use, and the regions of the outer surface of the pane contiguous with the chamfers are substantially coplanar with the outer surface of the parts of the vehicle body defining the window opening adjacent these regions.

This shaping of the edges of the pane allows the discontinuities in the outer surface of the body, which occur along the pillars and the cross member of the window, to be minimised and so render negligible the turbulence which originated from these discontinuities. It also gives the window a particularly agreeable aesthetic appearance which is like that of ground or polished glass used in the furnishing field.

Further characteristics and advantages of the invention will become apparent from the following description of a preferred embodiment, given purely by way of non-limiting example with reference to the appended drawing which is a horizontal section through the region of the body of a motor vehicle adjacent a vertical side (pillar) of a window.

A pane according to the invention, not illustrated in its entirety, is indicated 1.

Clearly visible, however, is a vertical edge 2 of the pane 1 slidably mounted within a channel-shaped guide body C fixed to a part D of the body of a motor vehicle (not illustrated).

The guide body C should be considered as being wholly of a known type. It is constituted essentially by a rigid metal core embedded in a profiled elastomeric body of generally S shape. One of the loop parts $C_1$ of the body C is fitted over a tab $D_1$ projecting from the body part D, while the other loop part $C_2$ of the body defines a channel which slidingly receives the edge 2 of the pane 1.

The movement of the pane 1 relative to the guide body C is controlled by drive means of known type, not illustrated.

The relevant characteristic of the pane according to the invention is the presence of the bevel or chamfer 3 on the corner of the edge 2 facing outwardly of the vehicle, which defines a narrowed or tapered outer edge portion 4.

Thus, the edge 2 is thinnest in correspondence with the outer margin of the pane 1. From this outer margin, the thickness of the pane 1 increases gradually towards the interior of the pane until it reaches its maximum value in correspondence with the inner margin of the chamfer 3.

The tapered portion 4 is housed slidably in the channel $C_2$ of the guide body C.

The angle of the chamfer 3 and its width (measured in a direction perpendicular to the outer margin of the pane) are selected so that practically the whole surface of the chamfer 3 cooperates with the corresponding wall of the channel $C_1$ of the guide body C. The region of the outer surface of the pane contiguous with the chamfer 3, generally indicated 5, is thus substantially coplanar with the outer surface of the parts of the vehicle body facing it, that is to say, with the parts of the body which define the outer edge portion of the window opening next to the region 5. In the embodiment illustrated, this outer surface is represented by the outer surface F of the guide body C and the body part D.

Naturally, the scope of the present invention also extends to embodiments which allow equal utility to be achieved using the same innovative concept.

We claim:

1. A sliding pane for a motor vehicle window having channel-shaped guide bodies fixed to those parts of the motor vehicle body defining the window opening, the pane having edges slidable in the channels of respective said guide bodies in use, wherein the improvements consist in the corners of the edges of the pane intended to face outwardly of the vehicle being chamfered to define outer tapered portions which can be housed slidingly in the channels of the respective guide bodies in use, and the regions of the outer surface of the pane contiguous with the chamfers being substantially coplanar with the outer surface of the parts of the vehicle body defining the window opening adjacent these regions.

* * * * *